United States Patent [19]
Howes

[11] Patent Number: 5,100,538
[45] Date of Patent: Mar. 31, 1992

[54] MAGNETIC TRAP ASSEMBLY WITH A NONMETALLIC TRAP STRUCTURE

[75] Inventor: Glenn E. Howes, Surrey, Canada

[73] Assignee: Edem Steel Ltd., Vancouver, Canada

[21] Appl. No.: 562,694

[22] Filed: Aug. 6, 1990

[51] Int. Cl.⁵ .............................................. B03C 1/00
[52] U.S. Cl. ...................... 209/215; 209/223.1; 209/225; 209/557; 209/636
[58] Field of Search ............ 209/38, 215, 223.1, 209/225, 636, 217, 567, 571, 930, 513, 228, 557, 564; 198/468.5, 690.1; 210/222

[56] References Cited

U.S. PATENT DOCUMENTS

| | | | |
|---|---|---|---|
| 2,089,138 | 8/1937 | Stearns et al. | 209/223.1 X |
| 2,109,076 | 2/1938 | Stearns et al. | 209/223.1 X |
| 2,340,303 | 2/1944 | Byrd, Jr. | 209/228 |
| 3,033,396 | 5/1962 | Kragle | 209/223.1 |
| 3,575,293 | 4/1971 | Nelson | 209/215 X |
| 3,672,496 | 6/1972 | Williams | 209/38 |
| 4,376,042 | 3/1983 | Brown | 209/38 |
| 4,541,530 | 9/1985 | Kenny et al. | 209/930 X |
| 4,844,235 | 7/1989 | Sherman | 209/920 X |

Primary Examiner—Donald T. Hajec
Assistant Examiner—Joseph A. Kaufman
Attorney, Agent, or Firm—John R. Uren

[57] ABSTRACT

A magnetic trap in the pan floor of a vibratory conveyor comprises a recess in the pan floor for momentarily receiving articles falling therein. A magnet is provided beneath the recess to retain magnetic articles in the recess.

5 Claims, 2 Drawing Sheets

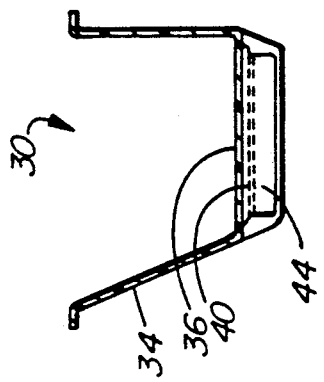
FIG. 3
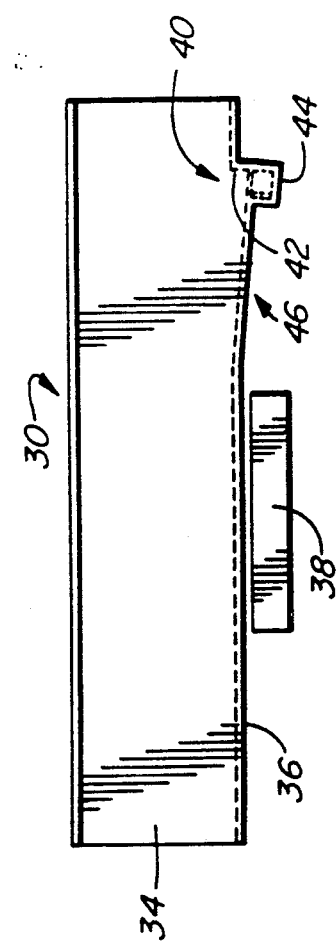
FIG. 2
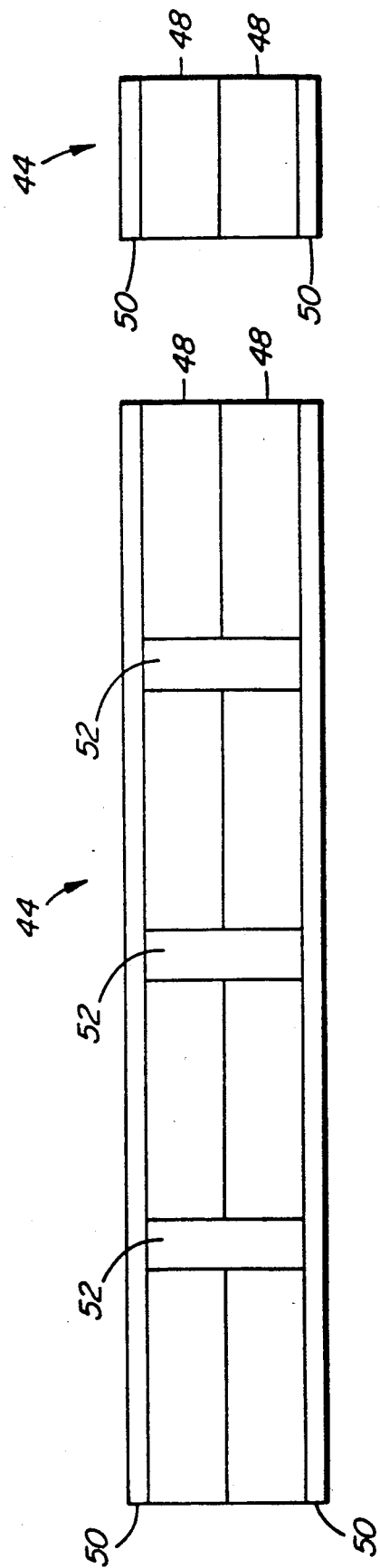
FIG. 5
FIG. 4

MAGNETIC TRAP ASSEMBLY WITH A NONMETALLIC TRAP STRUCTURE

INTRODUCTION

This invention relates to the removal of foreign substances from the flow in a conveyor. More specifically, it relates to the removal of magnetic objects from a nonmagnetic flow in a vibrating conveyor.

BACKGROUND OF THE INVENTION

In a processing system, conveyors are used to carry materials from one operation to the next. For operations to be performed effectively, the conveyed materials must meet some standard of purity. This requirement has produced various methods of separating flow elements in a conveyor system.

For example, in the forest products industry, machines operate on wood. The presence of harder substances such as metal can be dangerous to both the machines and the people operating them.

Conventionally, metal detectors are deployed along conveyors to stop the flow when metal is detected. The operators must then manually search for the metal and remove it. This method can disrupt production schedules.

When setting the sensitivity of the metal detector, the operator must strike a fine balance. A sensitive detector gives early warning and covers a large conveyor surface area. However, a sensitive detector needlessly disrupts flow when trace amounts of metal appear. Manual location and removal of these trace amounts is laborious.

SUMMARY OF THE INVENTION

According to the invention, there is provided, in a vibrating conveyor having an elongate vibrating pan with a floor and sidewalls defining an article flow path therealong, a magnetic trap in the form of a recess in the pan floor provided with magnetic means for retaining magnetic articles therein. In a preferred embodiment the recess has a shear leading edge and an upwardly sloped trailing edge having a summit that meets the pan floor. The magnetic trap is preferably located along a portion of the pan having nonmetallic sidewalls and a nonmetallic floor.

BRIEF DESCRIPTION OF THE DRAWINGS

FIG. 2 is a longitudinal section of a metal separation region of a pan of the conveyor of FIG. 1, showing the magnetic trap.

FIG. 3 is a cross section of the metal separation region of the pan of FIG. 2.

FIG. 4 is a longitudinal section of a magnet assembly of the magnetic trap according to the invention.

FIG. 5 is a cross section of the magnet assembly of FIG. 4.

DESCRIPTION OF A SPECIFIC EMBODIMENT

Figure 1:
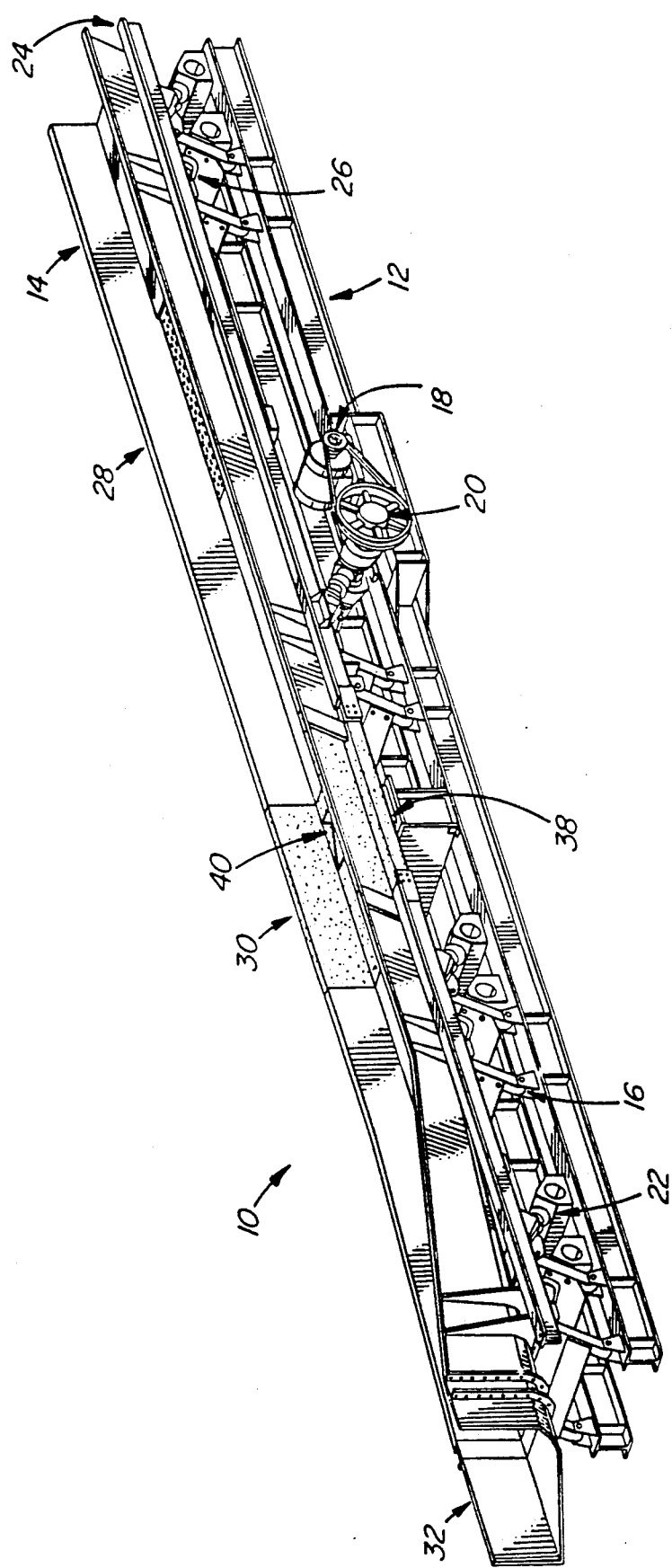
FIG. 1 is a three-dimensional view of a vibrating conveyor into which a magnetic trap assembly according to the invention is incorporated.

By way of example, a specific embodiment follows. It should be taken as only illustrative of the invention, and not as limiting its scope which should be construed in accordance with the accompanying claims.

With reference to FIG. 1, a vibrating conveyor is indicated generally at 10. The conveyor 10 comprises a base 12, a conveyor pan 14, a plurality of rockerlegs 16, a motor 18, an eccentric shaft 20, a plurality of coil spring assemblies 22, two balance bars 24, and a plurality of stabilizing crossties 26. The conveyor pan 14 further comprises a fines screen region 28, a metal separation region 30, and a conveyor spout 32.

With reference to FIG. 2 and FIG. 3, the metal separation region 30 is shown in greater detail. The metal separation region 30 comprises a pair of nonmetallic pan walls 34, a nonmetallic pan floor 36, a metal detector 38 and a trap 40. The metal detector 38 is spaced slightly below the pan floor 36 so that the metal detector 38 itself does not vibrate. It is also located away from the metal part of the pan 14. The trap 40 further comprises a sheer leading edge 42, an embedded magnet assembly 44, and an upward sloping trailing edge 46 having a summit that meets the pan floor 36.

With reference to FIG. 4 and FIG. 5, the magnet assembly 44 comprises a plurality of aligned magnets 48, two magnetic sidebars 50, and a plurality of nonmagnetic spacers 52. However, it will be appreciated that any suitable type of magnetic means may be used.

OPERATION

During operation of the vibrating conveyor 10, the pan 14 propels material along its length because it forms part of a harmonic system. The motor 18 drives the eccentric shaft 20 which supplies energy to the harmonic system comprised of the base 12, the pan 14, the rockerlegs 16, the coil spring assemblies 22, the balance bars 24, and the stabilizing crossties 26.

Two separation stages necessary to the forest products industry are indicated at 28 and 30. The fines screen region 28 is a sieve that removes undersized materials. The metal separation region 30 removes metallic materials.

According to the invention, metallic materials can be separated as depicted in FIG. 2 and FIG. 3. As the conveyed material flows through the metal separation region 30, it encounters the shear leading edge 42 of the trap 40. Large primary flow material (such as wood) will generally pass right over the trap 40 without effect. Smaller material will drop into the trap 40. If the trapped material is magnetic, it will be seized by the magnet assembly 44 and held back until the trap 40 is manually cleaned out by an operator at a nondisruptive time. If the trapped material is nonmagnetic, the harmonic motion of the pan 14 will carry it up the trailing edge 46, out of the trap 40 and back into the primary flow.

Because the trap 40 will remove many of the smaller metallic impurities as well as some of the larger ones, the metal detector 38 can be set at a higher sensitivity with fewer disruptions due to trace amounts of metallic impurities.

What is claimed is:

1. In a vibrating conveyor having a substantially horizontal conveyor pan, a magnetic trap in the conveyor pan to remove foreign metallic substances from a flow along the conveyor pan, the magnetic trap comprising:
   (a) a nonmetallic floor;
   (b) nonmetallic walls;
   (c) a nonmetallic recess in the floor to momentarily trap the flow; and
   (d) a magnet assembly beneath the recess to retain metallic objects in the recess.

2. An apparatus as in claim 1 wherein the recess further comprises:
(a) a shear leading edge; and
(b) an upwardly sloped trailing edge having a summit that meets the pan floor.

3. The apparatus as in claim 1, further comprising a metal detector beneath said nonmetallic floor and located in a direction which is downstream of said recess.

4. A magnetic trap unit for a vibrating conveyor, comprising:
(a) a nonmetallic floor;
(b) a pair of nonmetallic side walls on opposite sides of the nonmetallic floor;
(c) a nonmetallic recess in the floor having a sheer leading edge and an upwardly sloped trailing edge having a summit that meets the pan floor; and
(d) a metal detector beneath said nonmetallic floor and located adjacent the recess on the trailing edge side of the recess.

5. In a vibrating conveyor having a substantially horizontal conveyor pan, a magnetic trap unit in the conveyor pan, comprising:
(a) a nonmetallic floor;
(b) a pair of nonmetallic side walls on opposite sides of the nonmetallic floor;
(c) a nonmetallic recess in the floor having a sheer leading edge and an upwardly sloped trailing edge having a summit that meets the pan floor; and
(d) a metal detector beneath said nonmetallic floor and located adjacent the recess on the trailing edge side of the recess.

* * * * *